United States Patent
May

[15] 3,694,086
[45] Sept. 26, 1972

[54] CORRELATION SPECTROMETER
[72] Inventor: Donald L. May, Manhattan Beach, Calif.
[73] Assignee: Centron Engineering, Inc., Gardena, Calif.
[22] Filed: April 12, 1971
[21] Appl. No.: 133,192

[52] U.S. Cl. ..................356/51, 356/74, 356/82, 356/97, 356/189, 356/205
[51] Int. Cl. ......G01n 21/34, G01j 3/42, G01n 21/22
[58] Field of Search..........356/51, 74, 79, 82, 87, 96, 356/94, 97, 179, 184, 186, 189, 195, 205; 350/161; 310/8

[56] References Cited

UNITED STATES PATENTS

| 3,518,002 | 6/1970 | Barringer et al. | 356/97 |
|---|---|---|---|
| 3,512,889 | 5/1970 | Liston | 356/94 |
| 3,395,365 | 7/1968 | Fork | 350/161 |

OTHER PUBLICATIONS

" A Method of Background Correction..." Leys; Analytical Chemistry; Feb. 69; Vol. 41, No. 2; pg. 396- 398

Primary Examiner—Ronald L. Wibert
Assistant Examiner—V. P. McGraw
Attorney—Jessup & Beecher

[57] ABSTRACT

An improved correlation spectrometer is provided which may be used for the quantitative measurement of the amounts of such gases as $SO_2$, $CO_2$, NO, $NO_2$, and $N_2O_3$, in a gaseous discharge. The invention has particular utility, for example, in the measurement of sulphur dioxide ($SO_2$) in a flue discharge so that the sulphur dioxide level may at all times be maintained below acceptable ecological thresholds. The correlation spectrometer of the invention includes a piezoelectric transducer which effectively causes filters to be selectively and cyclically introduced into the optical path between an ultravoilet light source and a photoelectric transducer, so that the percent transmittance may be measured successively and repeatedly at two distinct wavelengths. The two wavelengths respectively correspond to an oabsorption line of the particular gas being measured, and to a wavelength displaced from the absorption line to provide a reference.

2 Claims, 4 Drawing Figures

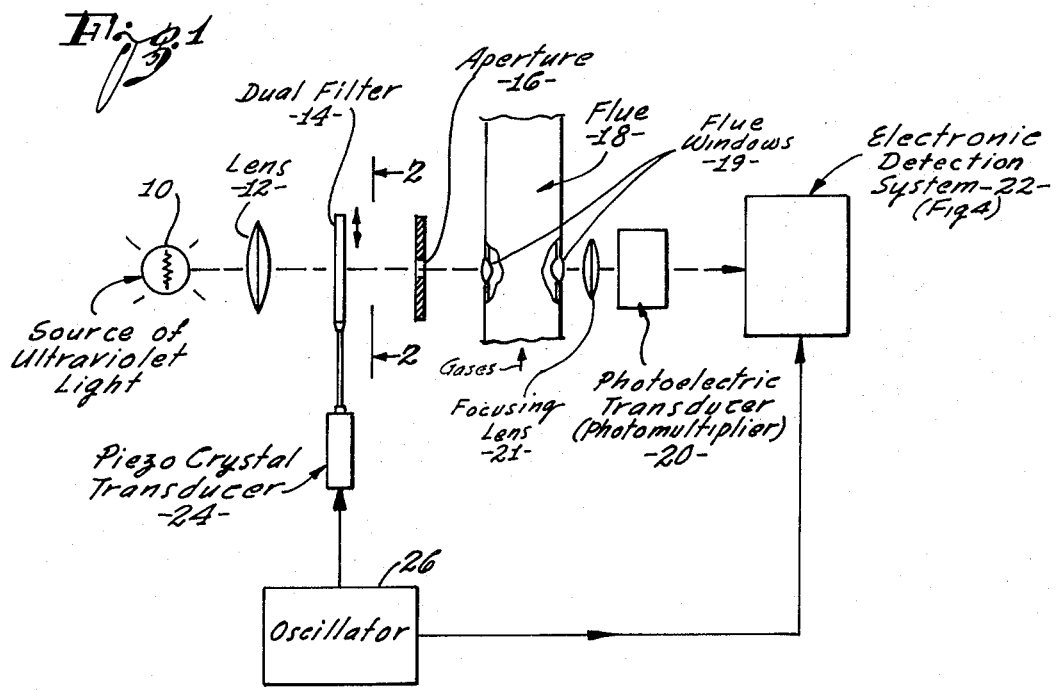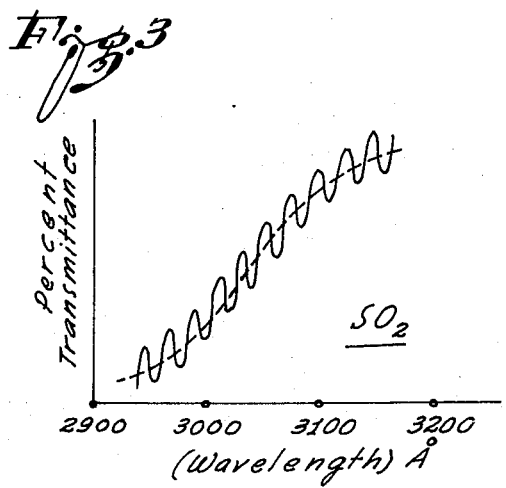

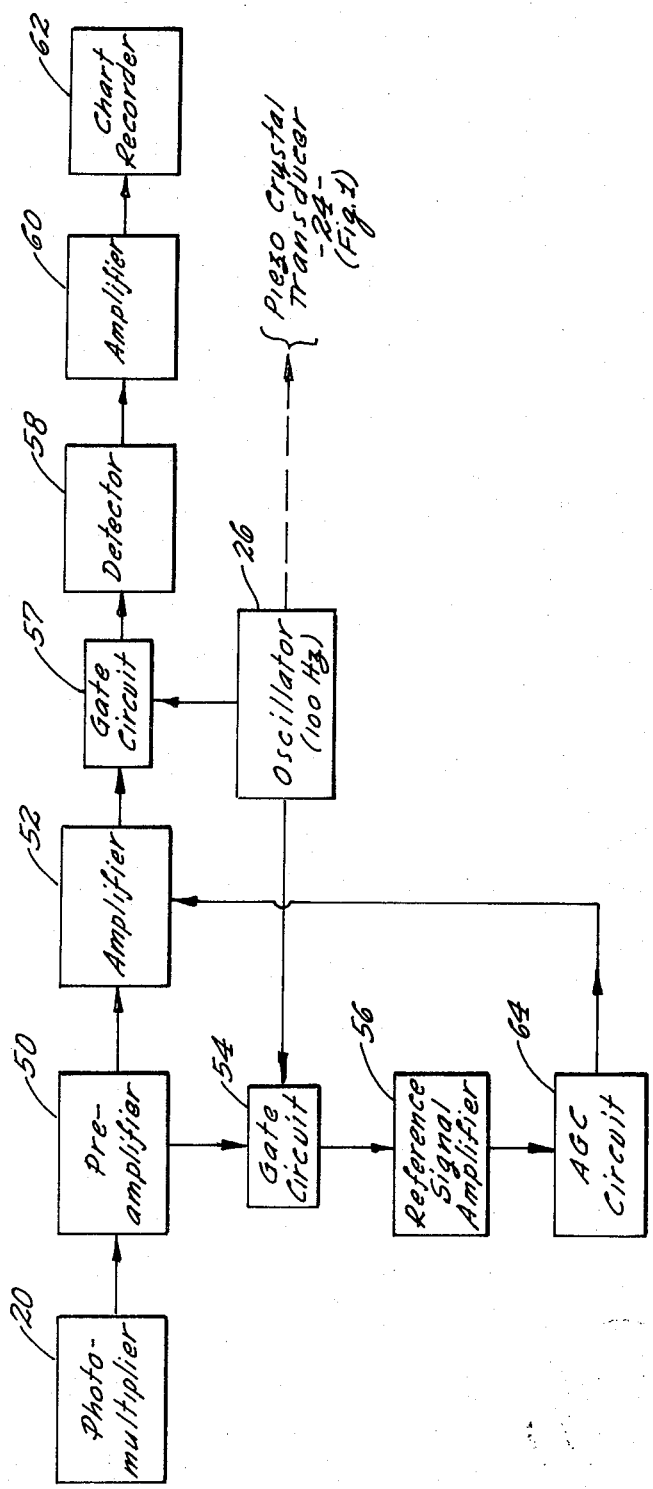

CORRELATION SPECTROMETER

BACKGROUND OF THE INVENTION

The correlation spectrometer has been recently developed, and it provides for the quantitative measurement of the amount of sulphur dioxide, and other selected gases, in the optical path between an ultraviolet light source and the instrument. The instrument is predicated on the principle that most gases are characterized by optical absorption bands which may occur in any part of the electromagnetic spectrum. These bands tend to be specific for each gas, and they constitute a unique means by which the gases can be identified. For example, an absorption spectra can be identified as sulphur dioxide by virtue of a 20 A. separation of the absorption lines. Other gases exhibiting absorption lines in the same spectral region as the sulphur dioxide have a line separation other than 20 A.

The correlation spectrometer provides, for example, a dual filter which is oscillated in the optical path. The filter is selected, for example, so that its first section passes a particular wavelength of light corresponding to the gas to be measured, such as $SO_2$; and so that its second section passes a wave length displaced a predetermined amount from the wave length passed by the first section of, for example, 20 A. for $SO_2$. With such an arrangement the percent transmittance detected when the ultraviolet light is passed through the first filter section represents all the gases including the $SO_2$, whereas the percent transmittance when the ultraviolet light is passed through the second filter section represents a reference level, since the $SO_2$ absorption is not detected. Then by subtracting one reading from the other the effect of the $SO_2$ alone may be measured.

The improved instrument of the present invention uses a piezoelectric crystal to control the dual filter. This crystal being driven at its selected frequency of, for example, 100 Hz by an appropriate oscillator. The dual filter may be mounted directly on the piezo crystal, so as to constitute a compact yet sturdy unit. Also, the dual filter may be removable, so that light filters having optical characteristics corresponding to different gases to be measured, such as set forth above, may be selectively mounted on the piezo crystal transducer.

BRIEF DESCRIPTION OF THE DRAWINGS

FIG. 1 is a schematic representation of an instrument constructed to incorporate the concepts of the invention;

FIG. 2 is an enlarged fragmentary view of the dual filter component of FIG. 1, taken along the line 2—2 of FIG. 1;

FIG. 3 is a curve representing the absorption spectra of sulphur dioxide; and

FIG. 4 is a block diagram of an appropriate electronic detection system for use in the system of FIG. 1.

DETAILED DESCRIPTION OF THE ILLUSTRATED EMBODIMENT

The system shown in the drawings includes, for example, an appropriate source of ultraviolet light designated 10. The light from the source 10 is directed through an appropriate lens system 12 which produces a beam of light directed through an optical path through a dual optical filter 14, and through an aperture 16. The beam passing through the aperture 16 is directed, for example, through a flue 18 through which gases are passing and through windows 19 in the side of the flue. After the beam has passed through the flue 18 it is focused by a lens 21 onto a photoelectric transducer represented by a block 20, and which, for example, may take the form of a photomultiplier.

The electric signal developed by the transducer 20 in response to the beam is a measurement of the percent transmittance of the gases passing through the flue 18. This signal is detected in an appropriate electronic detection system which will be described in some detail in conjunction with FIG. 4, and which is designated by a block 22.

The dual optical filter 14 is mounted on an appropriate piezo crystal transducer 24 which, in turn, is energized by an oscillator 26. The transducer is caused to vibrate at a predetermined frequency of, for example, 100 Hz, or other selected frequency, and it causes the dual filter 14 to oscillate back and forth across the path of the beam from the lens system 12. The piezo crystal transducer 24 may take any appropriate form, for example, it may be in the form of a rod. The filter 14 may be mounted on the said rod, and it may be removable so that other filters may be used.

The optical filter 14, as shown in FIG. 2, has two sections, a first section 14a and a second section 14b, the sections being separated by an intermediate opaque section. The section 14a, for example, may be constructed to pass light at a wavelength of 2,900 A., whereas the section 14b may be constructed to pass light of a wavelength of 3,100 A. Such a filter is suitable for the measurement of sulphur dioxide ($SO_2$) in the gas within the flue 18.

As shown by the curve of FIG. 3, for example, sulphur dioxide ($SO_2$) has an absorption line of 3,100 A., and has a minimum absorption response at 2,900 A. Therefore, when the optical filter 14 is shifted to a first position by the transducer 24 so that the section 14a is in the optical path in FIG. 1, the percent transmittance detected by the electronic detection system 22 constitutes the reference level. On the other hand, when the filter 14 is shifted to a second position by the transducer 24 so that the section 14b is the optical path, the percent transmittance detected by the detection system 22 represents the reference level plus the percent transmittance of the sulphur dioxide ($SO_2$)

As mentioned above, the optical filter 14 may be replaced by other optical filters having different characteristics, when it is desired to measure other gases. For example, a dual optical filter having a first section construction to pass light of a wavelength of 3,000 A. and a second section constructed to pass light of a wavelength of 3,200 A. is suitable for the detection of carbon dioxide ($CO_2$). The other gases listed above also have their particular wavelengths at which their absorption lines appear, and their particular distinctive displaced wavelengths at which the absorption is essentially zero for that particular gas.

As shown in FIG. 4, the signal produced by the photomultiplier 20 is first amplified in a preamplifier 50, and the amplified signal from the preamplifier is divided into two paths. In the first path the signal is applied to a further amplifier 52, and in the second path the signal is introduced through a gate circuit 54 to a reference signal amplifier 56.

The signal from the amplifier 52 is passed through a gate 57 and detected in a detector 58, and the resulting signal is applied to an amplifier 60 in which it is amplified and introduced to an appropriate display or recording means such as a chart recorder 62. The oscillator 26 which drives the piezo crystal transducer 24 also applies output signals to the gate circuit 54 and to the detector and gate circuit 57. The output from the reference signal amplifier 56 is applied to an AGC circuit 64 which controls the gain of the system, for example, by controlling the gain of the amplifier 52.

The oscillator 26 drives the gate circuit 54, so that it is effective to pass a signal from the preamplifier 50 to the reference signal amplifier 56 at intervals in which the section 14a of the optical filter 14 is interposed in the optical path. Likewise, the gate circuit 57 is controlled by the oscillator 26, so that it passes a signal from the amplifier 52 to the detector 58 only when the section 14b of the optical filter 14 is in the optical path.

The circuit of FIG. 4, therefore, is effective in causing the signal from the photomultiplier corresponding to the reference level to control the reference gain of the electronic system. Then, the signal corresponding to the sulphur dioxide ($SO_2$), or other gas, is passed to the detector 58 at the reference gain, so that the amplifier 60 applies a signal to the chart recorder 62 which is a measurement of the actual percent transmittance of the sulphur dioxide. The chart recorder 62 may be used to provide a continuous record of the sulphur dioxide, for example, so that appropriate steps may be taken whenever the sulphur dioxide level exceeds a predetermined threshold.

It is apparent that the electronic system of FIG. 4 represents but one particular means for detecting the percent transmittance signal developed by the photomultiplier, and that other electronic systems including, for example, differential amplifiers, and the like may be used. It is also apparent that any appropriate display or recording means may be used for displaying or recording the output from the system of FIG. 4, and the appropriate alarms may be incorporated into the system to be activated when the percent transmittance of the monitored gas exceeds a preset level.

Therefore, while particular embodiments of the invention have been shown and described, modifications may be made, and it is intended in the following claims to cover the modifications which come within the spirit and scope of the invention.

What is claimed is:

1. A correlation spectrophotometer including: optical filter means having a first section constructed to pass light at a selected first wavelength and having a second section constructed to pass light at a second wavelength displaced a particular increment from said first wavelength; piezoelectric transducer means supporting said optical filter means in an optical path to cause said first and second filter sections to be successively and cyclically positioned in said optical path, an oscillator electrically coupled to said piezoelectric transducer means to cause said transducer means to oscillate at a predetermined frequency, photoelectric transducer means disposed in said optical path and responsive to light passed successively and cyclically through said first and second sections of said optical filter means, and an electronic detection system electrically coupled to said photoelectric transducer and responsive to the signal therefrom for producing an output signal representative of the percent transmittance of a particular gas traversing the aforesaid optical path.

2. The correlation spectrophotometer defined in claim 1, and which includes a source of ultraviolet light; and lens means for forming the ultraviolet light from said source into a beam and for directing the beam along the aforesaid optical path.

* * * * *